W. W. DUNCAN & N. E. TOUSLEY.
APPARATUS FOR PRODUCING RUBBER COATED BLANKS.
APPLICATION FILED SEPT. 16, 1909.
1,016,483.  Patented Feb. 6, 1912.
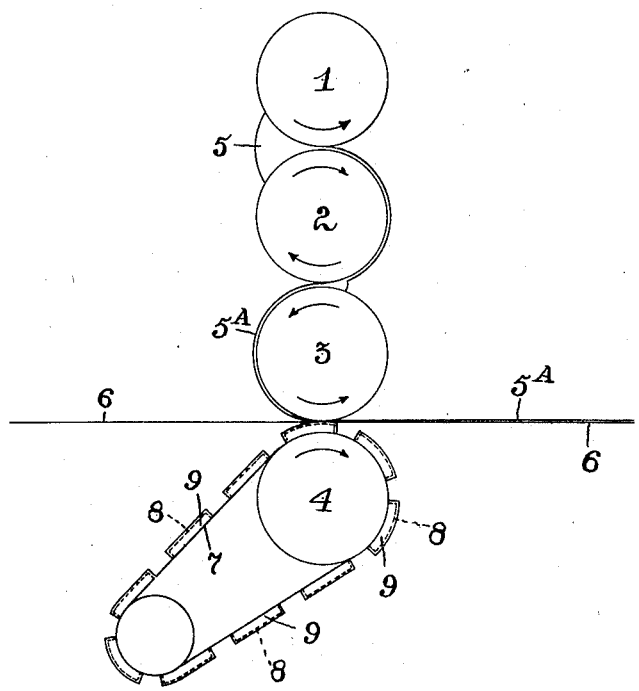
Attest:
Ewd L. Jolson
Bent M. Stahl
Inventors:
William W. Duncan,
Nelson E. Tousley,
By Offner Middleton Donaldson
Atty's.

UNITED STATES PATENT OFFICE.

WILLIAM W. DUNCAN AND NELSON E. TOUSLEY, OF WATERTOWN, MASSACHUSETTS, ASSIGNORS TO HOOD RUBBER CO., OF BOSTON, MASSACHUSETTS.

APPARATUS FOR PRODUCING RUBBER-COATED BLANKS.

1,016,483.  Specification of Letters Patent.  Patented Feb. 6, 1912.

Application filed September 16, 1909. Serial No. 518,092.

*To all whom it may concern:*

Be it known that we, WILLIAM W. DUNCAN and NELSON E. TOUSLEY, citizens of the United States, residing at Watertown, Massachusetts, have invented certain new and useful Improvements in Apparatus for Producing Rubber-Coated Blanks, of which the following is a specification.

Our invention relates to improvements in the art of making linings from which articles such as rubber boots and shoes are made.

As is well known in the manufacture of rubber boots and shoes, the linings are cut from a rubber coated or frictioned fabric in various shapes by means of dies. Heretofore it has been customary to coat the entire sheet of fabric with rubber in a suitable calender, and then, by the use of dies or patterns, to cut out linings of the required shape. This entails a considerable loss of rubber, as the portions between the patterns are of irregular shape, and while the rubber of such scraps may be reclaimed, the work is not economical. Further, the coating of the entire sheet necessitates that the cutting be performed as a separate operation, entailing extra manipulation, which, with large sheets of unvulcanized stock, is difficult and requires great care.

According to the present invention, the fabric sheet is coated with rubber only at or on the portions, which, when severed, constitute the linings, and the fabric is severed on the lines which constitute the boundaries of the linings simultaneously with the coating operation.

The apparatus for carrying out our improved process may comprise an ordinary calender having a plurality of rolls between which the fabric is fed, rubber being applied to the fabric as it passes between the rolls. Such a calender with the necessary attachments is shown in the accompanying drawing, in which the figure represents a diagrammatic elevation.

Referring by reference characters to this drawing, the numerals 1, 2, 3, and 4 designate the calender rolls, 5 the lump or mass of rubber coating compound which is fed between the bight of the rolls 1 and 2, thus passing in a thin rubber layer between 2 and 3 and around 3 in the direction of the arrows, 6 the fabric sheet which is fed from a supply roller and passes between the rolls 3 and 4 receiving as it passes the film of rubber 5$^A$. Around the roll 4 we pass an endless apron 7 which is passed between the roll and the fabric 6 to be coated. Upon this apron are arranged in relief the patterns 8 corresponding to the lining portions to be coated. Each pattern relief 8 is fitted with a narrow rim or band of metal 9 extending completely around the outline of the pattern and projecting slightly above the level of the pattern in order to cut the cloth.

The method of procedure is as follows: The rubber compound 5 is fed as usual between the rolls 1 and 2, then between 2 and 3, coming around the surface of the roll 3 in a thin film 5$^A$ of the desired thickness of rubber compound to go on the fabric. The fabric strip 6 is fed from a roll between the sheet of gum 5$^A$ on roll 3 and the apron 7. The distance between rolls 3 and 4 is set so that the raised pattern on the belt presses the cloth against the film of gum 5$^A$ on roll 3. The heat of the roll 3 is so regulated and the pressure of the roll 4 is such that the rubber film 5$^A$ is taken off on the cloth only at the spots where the patterns press. At the same time, the metal rims, 9, press against the fabric 6 with a greater pressure than the cloth patterns 8, severing the cloth at the outlines of the patterns. The cloth 6, coming out at the right, is thus coated with rubber compound only at the places desired, the spaces between the patterns being free from gum. The coated linings between the raised patterns issue as separate articles, allowing the rubber to be returned to the calender and the fabric scraps having no rubber adhering thereto can be sold for cloth scrap, thus effecting a double saving.

Having thus described our invention, what we claim is:—

An apparatus for producing rubber coated linings, comprising a fabric feeding device, a device for producing a film of rubber, means for causing said film of rubber to be pressed upon the fabric at portions only thereof, to cause the rubber to adhere to the fabric and means for simultaneously with said pressure severing the adhering portions.

In testimony whereof, we affix our signatures in presence of two witnesses.

WILLIAM W. DUNCAN.
NELSON E. TOUSLEY.

Witnesses:
ALFRED A. GLIDDEN,
CHARLES P. FLORA.